(12) United States Patent
Terada et al.

(10) Patent No.: US 7,092,791 B2
(45) Date of Patent: Aug. 15, 2006

(54) ROBOT SYSTEM AND MACHINING METHOD WITH ROBOT SYSTEM

(75) Inventors: Akihiro Terada, Fujiyoshida (JP);
Toshihiko Inoue, Yamanashi (JP);
Kazutaka Nakayama, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 09/265,432

(22) Filed: Mar. 10, 1999

(65) Prior Publication Data

US 2002/0143435 A1   Oct. 3, 2002

(30) Foreign Application Priority Data

Mar. 10, 1998   (JP)   ................... 10-078277

(51) Int. Cl.
*G06F 19/00* (2006.01)
(52) U.S. Cl. ........................................ 700/245; 901/41
(58) Field of Classification Search .................. 700/95, 700/134, 164, 179, 159, 160, 165, 166, 167, 700/186, 192, 213, 243, 250; 901/41, 42
See application file for complete search history.

(56) References Cited

U.S. PATENT DOCUMENTS

| | | | | |
|---|---|---|---|---|
| 4,507,042 A | * | 3/1985 | Suzuki et al. ................ | 414/680 |
| 4,602,345 A | * | 7/1986 | Yokoyama ................... | 700/251 |
| 4,694,139 A | | 9/1987 | Röder | |
| 4,728,974 A | * | 3/1988 | Nio et al. ..................... | 348/359 |
| 4,755,232 A | * | 7/1988 | Thones et al. ............... | 148/195 |
| 5,570,920 A | * | 11/1996 | Crisman et al. ............ | 294/111 |
| 5,770,936 A | * | 6/1998 | Hirai et al. ................... | 318/538 |

FOREIGN PATENT DOCUMENTS

| | | |
|---|---|---|
| EP | 0265661 | 5/1988 |
| EP | 0296 422 A2 * | 10/1988 |
| EP | 0672496 A2 | 9/1995 |
| JP | 56-175176 | 12/1981 |
| JP | 59021478 | 2/1984 |
| JP | 138074 | 8/1984 |
| JP | 59-174278 | 10/1984 |
| JP | 63278671 | 11/1988 |

(Continued)

OTHER PUBLICATIONS

Bruno Jau, "Dexterous Telemanipulation with Four Fingered Hand System", IEEE International Conference on Robotics and Automation, Jun. 1995.*

(Continued)

*Primary Examiner*—Thu V. Nguyen
(74) *Attorney, Agent, or Firm*—Staas & Halsey LLP (57) ABSTRACT

A robot system and a machining method capable of accurately and simply cutting an end of a pipe into a saddle shape and forming a hole on an outer surface thereof, and further machining a workpiece of a three-dimensional shape which does not have platelike shape. A tool unit is attached to a final axis of a moveable arm of a robot. The tool unit is provided with a first additional variable axis expanding and retracting vertically and a second additional variable axis expanding and retracting in the horizontal direction. By rotating the final axis, a cutting tool (machining nozzle of laser) at a distal end of the tool unit is turned about the final axis to cut a workpiece W of a pipe shape. By driving the first and the second additional variable axes in synchronism with rotation of the final axis, the cutting into a saddle shape and the forming of a hole are carried out. The movable arm of the robot is only for rotating the final axis and the machining accuracy is promoted.

10 Claims, 8 Drawing Sheets

FOREIGN PATENT DOCUMENTS

| | | |
|---|---|---|
| JP | 3-4378 | 1/1991 |
| JP | 8-10977 | 1/1996 |
| JP | 8-197250 | 8/1996 |
| JP | 10-291072 | 11/1998 |

OTHER PUBLICATIONS

Nishida et al, Development of an EVA end-effector, grapple fixtures and tools for the satellite mounted robot system, IEEE 199.*

* cited by examiner

ROBOT SYSTEM AND MACHINING METHOD WITH ROBOT SYSTEM

BACKGROUND OF THE INVENTION

1. Field of the Invention

The present invention relates to a robot system for machining a workpiece by a tool unit attached to a distal end of a robot movable arm, and a method of machining with such robot. In particular, the invention relates to a robot system suitable for cutting an end of a pipe in a saddle shape and for forming a hole on a side face of the pipe, and a method of machining using the robot system.

2. Description of the Related Art

Figure 11:
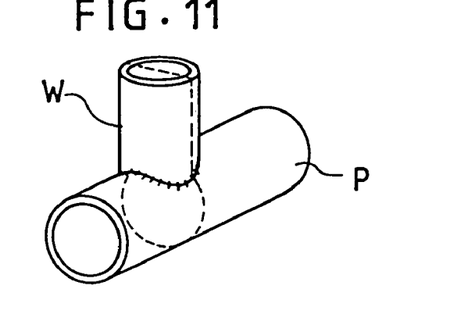
FIG. 11 is a schematic view showing jointing of pipes.

In recent years, there have been many cases in which pipes are used for parts of a suspension of an automobile. With increase of using pipes for parts of the automobile suspension, there has been an increase in machining operation for cutting an end face of a pipe W in a saddle shape and machining operation for forming a hole on a side face of a pipe part, as shown in FIG. 11. In the machining operation of cutting in a saddle shape and forming a hole on a side face of a pipe, a machining tool needs to operate accurately in a three-dimensional space and even when the machining operation is carried out by a robot, a path control function higher than that of an ordinary level is required.

Figure 13:
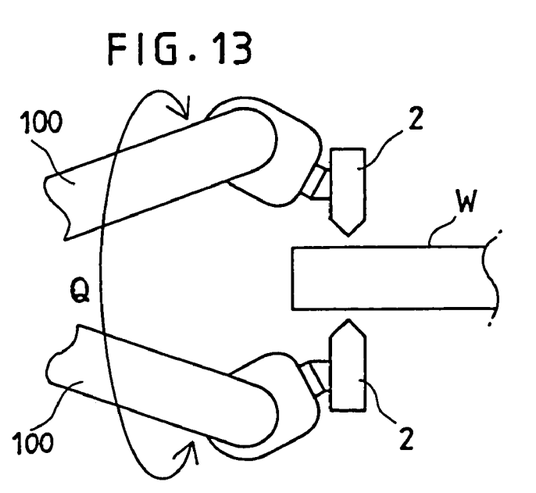
FIG. 13 is a schematic view showing a conventional machining method in which a pipe-shaped workpiece is cut by a robot.

When carrying out the machining operation by a robot on a workpiece which does not have platelike shape, such as a cylindrical workpiece, a workpiece having an elliptic section or a prism or a pyramid, in the conventional art, a cutting tool is attached at a distal end of a movable arm of a robot at a predetermined angle and the machining is carried out by totally operating a plurality of axes of the robot movable arms as shown in FIG. 13. In the case shown in FIG. 13, a cutting tool 2 of laser nozzle attached to the distal end of a movable arm 100 of the robot is brought to face the workpiece W of a pipe shape and a plurality of the movable arms of the robot are driven to turn the distal end of the movable arm 100 as shown by an arrow Q with respect to the workpiece W, thereby cutting the workpiece W or forming a hole on the workpiece W. As described, since the machining operation is carried out by totally operating the plurality of axes of the robot movable arm, accuracy of a machined face is lowered by vibration of the robot.

Figure 12A:
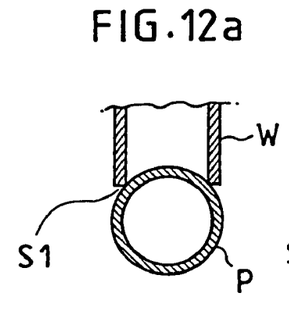
FIGS. 12a and 12b are schematic views showing a relationship between a cut face of a pipe-shaped workpiece and a pipe in jointing.
Figure 12B:
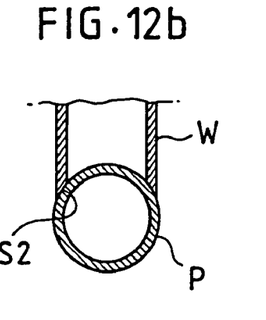

Further, in machining a workpiece of a pipe shape using a conventional robot, a cut face S1 of the pipe shaped workpiece W is made perpendicular to circumferential surface of the workpiece W as shown in FIG. 12a, and the machining to form a slant cut face S2 at an angle relative to the circumferential surface as shown in FIG. 12b can not be performed. When pipes are welded to join them as shown in FIG. 11, it is difficult to carry out a firm welding if the cut face S1 is perpendicular to a circumferential surface of a pipe as shown in FIG. 12a, and the machining of cutting a pipe in a saddle shape performed by the conventional robot is not suitable for the welding for forming a joint.

SUMMARY OF THE INVENTION

It is an object of the invention to provide a robot system capable of accurately and simply cutting an end face of a pipe in a saddle shape, forming a hole on a side face of a pipe, and further machining a surface of a workpiece having a three-dimensional shape, and a machining method using the robot system.

A robot system of the present invention comprises: a movable arm including a plurality of links connected by joints and controlled by a robot controller having a software processing function; and a tool unit mounted on a distal end of the movable arm, and having an effecting end biased with respect to a final rotational axis of the movable arm and directed to the final rotational axis. Further, the tool unit is provided with a variable axis for linearly moving the effecting end and/or rotating the effecting end thereof.

When machining a workpiece of a pipe shape using the robot, the final rotational axis of the robot movable arm is brought to coincide with a central axis of the pipe-shaped workpiece and the final axis of the robot movable arm is rotated to machine the workpiece by the tool unit.

DETAILED DESCRIPTION OF THE PREFERRED EMBODIMENTS

Hereinafter, a description will be made on an example of a laser machining robot system for cutting a workpiece or making a hole on a workpiece by laser using a laser nozzle as a cutting tool provided at a distal end of a tool unit, according to an embodiment of the invention.

Figure 1:
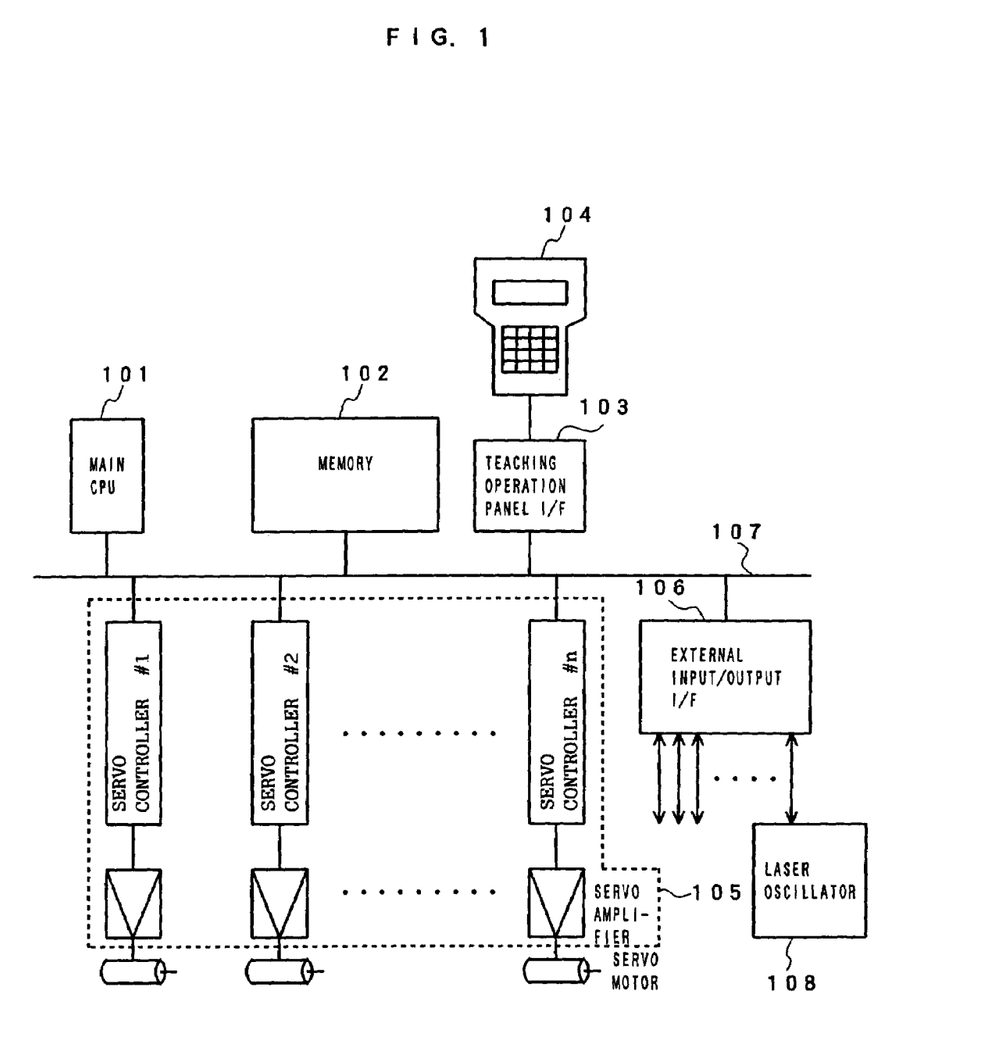
FIG. 1 is a block diagram of essential portions of an embodiment of a robot controller according to the invention.

FIG. 1 is a block diagram showing essential part of a hardware architecture of a robot controller for carrying out the invention and the architecture is the same as that of a conventional robot controller. A bus 107 is connected with a main CPU 101, a memory 102 including RAM, ROM and a nonvolatile memory (EEPROM), an interface 103 for a teaching operation panel, an input/output interface 106 for external device and a servo control unit 105.

A teaching operation panel 104 connected to the interface 103 is an ordinary one with display function by LCD and an operator can perform teaching, modifying and registering of an operation program for the robot and setting of various parameters, as well as command a playback operation of a taught operation program and a jog feed through manual operation of the teaching operation panel 104. Further, the display is used for information to an operator, display of inputted data and simulation result.

A system program for supporting basic functions of the robot and the robot controller is stored in ROM of the memory 102. Further, the operation program of the robot which is taught in accordance with an application, and related set data are stored in the nonvolatile memory of the memory 102. Further, RAM of the memory 102 is used for temporary storage of data in various calculation processings which are carried out by the CPU 101.

The servo control unit 105 comprises servo controllers #1–#n (n: the sum of the number of total axes of the robot and the number of variable axes in a tool unit), receives a motion command produced by calculation processing for controlling the robot (path planning, interpolation and inverse transformation based thereon) and controls servo motors as actuators for respective axis mechanisms of the robot through respective servo amplifiers.

Further, external input/output circuits of the input/output interface 106 are connected to sensors provided at the robot and actuators and sensors at peripheral devices, particularly to a laser oscillator 108 in relation with the invention. A tool unit having a laser nozzle is attached to a distal end of a movable aim of the robot and a laser beam emitted from the laser oscillator 108 is irradiated from a machining nozzle to a workpiece thereby cutting the workpiece.

The constitution of the above-described robot controller is not different from that of a conventional robot controller, but the robot system according to the invention differs from the conventional one in that the tool unit is attached to the distal end of the movable arm of the robot and when the tool unit has a movable element, the movable element of the tool unit is also controlled as an additional axis by the servo control unit 105 in the robot controller.

Figure 2:
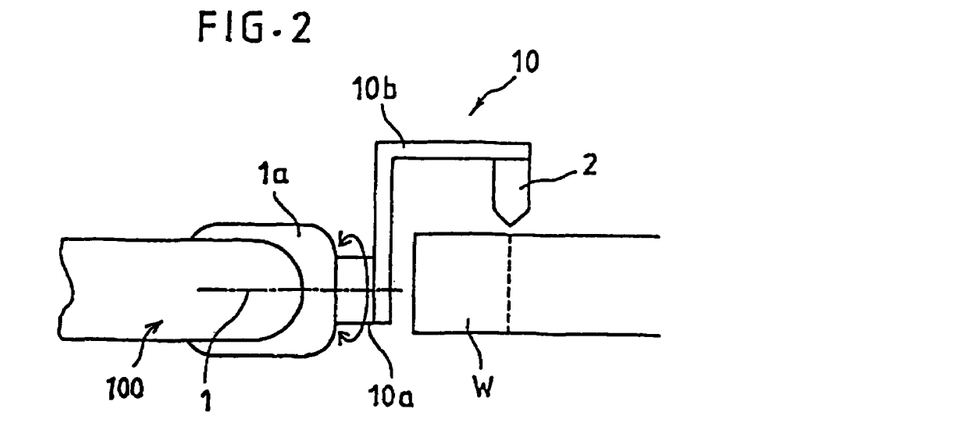
FIG. 2 is a schematic view of a tool unit according to a first embodiment of the invention.

FIG. 2 is a schematic view of essential portions according to a first embodiment of the invention.

A robot wrist 1a is provided at a distal end of a robot movable arm 100 and a tool unit 10 is attached to the robot wrist 1a so that a rotational center axis of the robot wrist, as a final axis 1 of the movable arm 100, coincides with a rotational center of the tool unit 10. The tool unit 10 comprises an attachment portion 10a for attaching the tool unit 10 to the robot wrist 1a, a link 10b in a shape of "L" extending perpendicularly to the final rotational axis 1 of the movable arm 100 from the attaching portion 10a and bent to extend parallel to the final rotational axis 1, and a machining nozzle 2 attached at a distal end of the link 10b so that a laser irradiating direction is perpendicular to the final rotational axis 1 of the movable arm 100.

In performing a cutting operation at an end face of the workpiece W of a pipe shape by the robot having the tool unit 10, the robot is positioned so that the final axis 1 of the robot movable arm 100 (the rotational center axis of the robot wrist 1a) coincides with a central axis of the pipe-shaped workpiece W and the machining nozzle 2 is located at a cutting position on the workpiece W. Then, a laser beam is irradiated from the machining nozzle 2 to the workpiece W, while rotating the final axis 1 of the robot movable arm 100 to thereby cut the workpiece W.

In this cutting operation of the workpiece W of a pipe shape, only the final axis 1 of the movable arm 100 is driven to rotate during the operation, and thus the machining accuracy is made high and the machining operation can be carried out simply.

The cutting position in the axial direction of the workpiece W (left and right direction in FIG. 2) can be selected to some degree by moving the position of the robot wrist 1a in the left and the right direction in FIG. 2. However, there is limit to the a diameter of the workpiece W which can be cut only by rotating the final axis 1 of the robot movable arm by using the tool unit 10. With respect to a pipe having a radius larger than a distance between the rotational center axis of the tool unit 10 (the final rotational axis of the robot movable arm) and the distal end of the machining nozzle 2, that is, larger than a shifting or biasing amount of the machining nozzle, the workpiece cannot be cut by only rotating the final axis 1 of the robot movable arm. In this case, the machining operation must be carried out by totally driving a 1 of the movable area of the robot.

Further, with respect of workpieces of a square prism shaped pipe constituted by a combination of planes and an elliptic shaped pipe which are not of cylindrical shape, or with respect to saddle shape cutting of a cylindrical pipe, such workpiece cannot be cut with the robot having the tool unit 10 by only rotating the final axis 1 of the robot movable arm. In such a machining operation, a plurality of variable axes of a robot have to be driven.

In view of the above, a description will be made on a second embodiment having a tool unit capable of machining workpieces having various shapes and capable of cutting in a saddle shape and forming a hole on a surface of a workpiece of a pipe shape by providing one or more additional variable axis to the tool unit, referring to FIG. 3.

Figure 3:
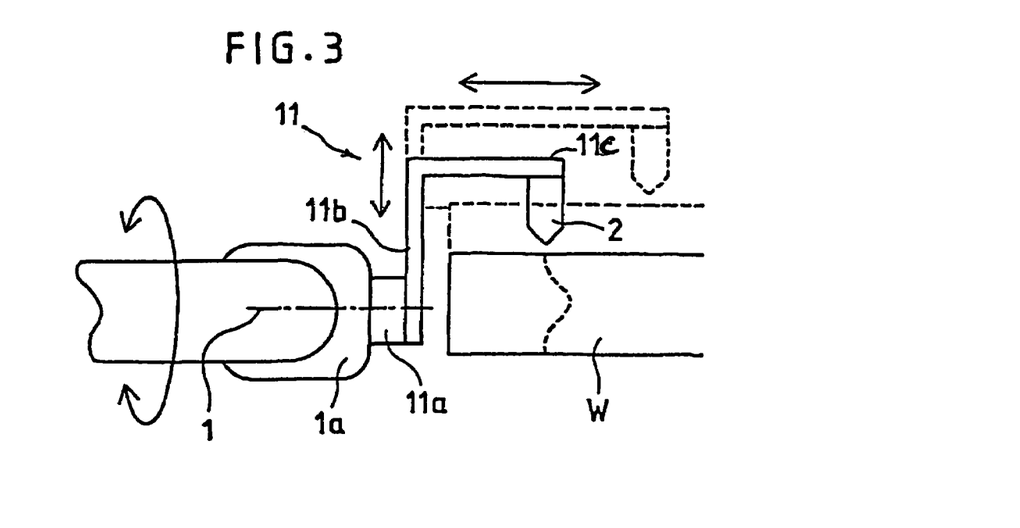
FIG. 3 is a schematic view of a tool unit according to a second embodiment of the invention.

A tool unit 11 schematically shown in FIG. 3 comprises an attaching portion 11a for attaching the tool unit to the robot wrist 1a with a final rotational axis 1 at a distal end of the robot movable arm, a first additional variable axis 11b for performing extending and retracting motions from the attaching portion 11a perpendicularly to the final rotational axis 1 of the movable arm, a second additional variable axis 11c connected perpendicularly to a distal end of the first additional variable axis 11b for performing extending and retracting motions in the direction of the final rotational axis 1 of the movable arm of the robot, and the machining nozzle 2 attached to a distal end of the second additional variable axis 11c so that a laser irradiation direction is perpendicular to the final rotational axis 1 of the robot movable arm.

Each of the above-described first and second additional variable axes is constituted by a rotational motion/linear motion converting mechanism for converting a rotational motion of a motor into a linear motion such as a linear mechanism using a motor and a ball screw or using a lever member. Further, an air cylinder or a linear guide driven by a servo motor can be used.

Motors for driving the first and the second additional variable axes 11b and 11c mentioned above are respectively controlled by a servo control by servo controllers for controlling additional axes in the servo control unit 105 of the robot controller.

According to the second embodiment, with the provision of the first additional variable axis 11b, the workpieces W having various diameters can be cut. That is, by driving the first additional variable axis, a distance (bias or shift distance) between the distal end of the machining nozzle 2 and the final rotational axis 1 of the robot movable arm which is the rotational center axis of the tool unit 11, may be adjusted in conformity with the radius of the workpiece W of a pipe shape to be cut. In the cutting operation, similar to the above-described first embodiment, the robot is positioned so that the central axis of the workpiece W coincides with the center of the robot wrist (the final rotational axis 1 of the robot movable arm and the rotational center axis of the tool unit 11), and an effecting end of the machining nozzle is positioned to a cutting position (in left and right direction of FIG. 3) of the workpiece W by driving the second additional variable axis 11c. Then, a laser beam is irradiated from the machining nozzle 2 to the workpiece W to cut the workpiece W while rotating the final axis 1 of the robot movable arm.

Further, by performing rotation of the final axis 1 of the robot movable arm and driving of the second variable axis 11c are carried out in synchronism, cutting of saddle shape designated by a broken line in FIG. 3 or forming a hole on the surface of the workpiece W can be carried out. That is, a saddle shape cutting can be carried out by reciprocating the second additional variable axis. 11c twice at a predetermined stroke in synchronism with rotation of the final axis 1 of the movable arm during one rotation of the final axis. Further, a hole can be formed on a surface of the workpiece W of a pipe shape by reciprocating the second additional variable axis 11c at a predetermined stroke during a period in which the final axis 1 is rotated in one direction by a predetermined angle, and subsequently reciprocating the second additional variable axis 11c in a reverse direction at the predetermined stroke during a period in which the final axis 1 is rotated in a reverse direction by the predetermined angle.

Figure 4A:
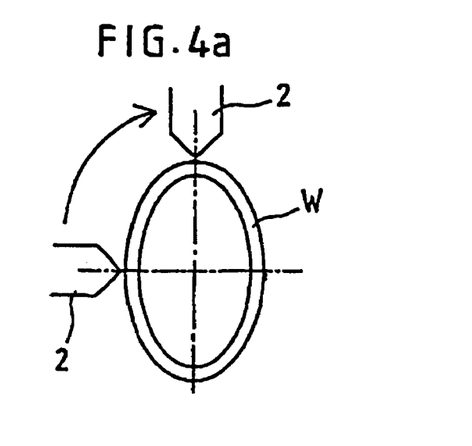
FIGS. 4a and 4b are schematic views showing a cutting operation of a pipe having an elliptic section and a square section according to the second embodiment of the invention.
Figure 4B:
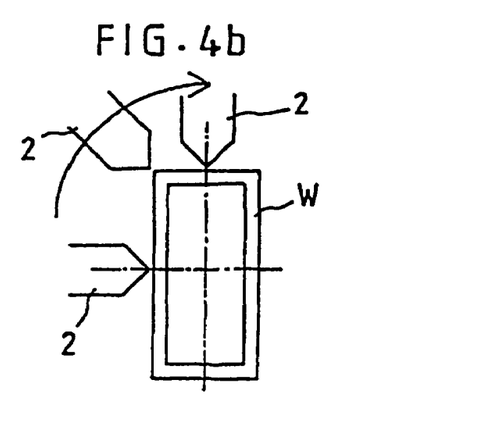

Further, by synchronizing the rotation of the final rotational axis 1 with the movement of the first additional variable axis, cutting operation can be carried out on a pipe-shaped workpiece W having an elliptic section or a pipe-shaped workpiece W having a square section, as shown in FIGS. 4a and 4b.

That is, by providing the first additional variable axis 11b at the tool unit 11, the robot can carry out cutting operation of a workpiece W of a shape of cylindrical pipes having different diameters or cutting operation of a pipe having an elliptic section or a square section. Further, by providing the second additional variable axis 11c at the tool unit 11, the robot can carry out forming a hole on a surface of a pipe and cutting a saddle shape at an end face of a pipe by driving the additional variable axis 11c of the tool unit 11 only by rotating the final axis 1 of the robot movable arm. Further, by providing the first and the second additional variable axes 11b and 11c at the tool unit 11, the robot can cut a workpiece W of a shape of cylindrical pipes having different diameters, cutting a saddle shape, cutting a pipe having an elliptic or a square section and forming a hole on a surface of a pipe only by rotating the final axis 1 of the movable arm of the robot.

Figure 5:
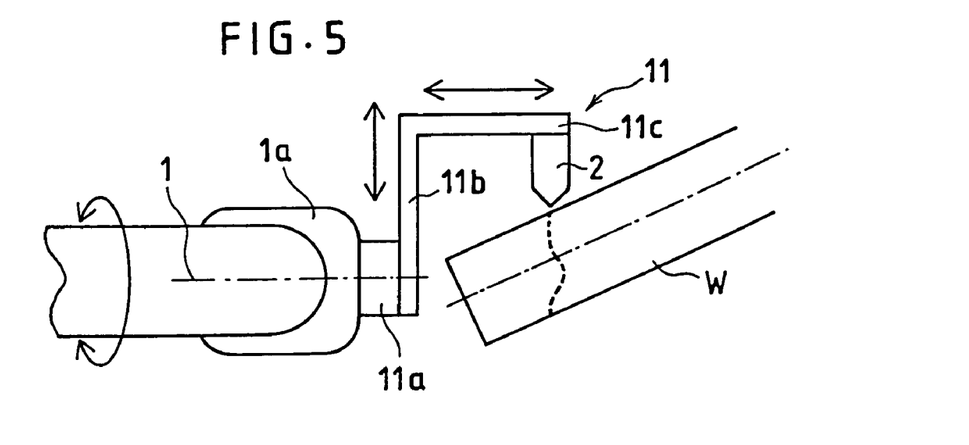
FIG. 5 is a schematic view showing an inclined cutting according to the second embodiment of the invention.
Figure 6A:
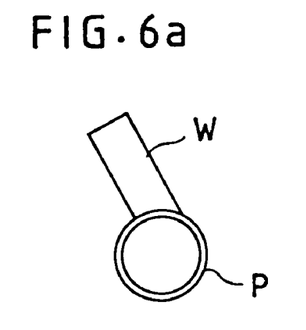
FIGS. 6a and 6b are schematic views of jointing of a pipe and a workpiece which is cut by the inclined cutting.
Figure 6B:
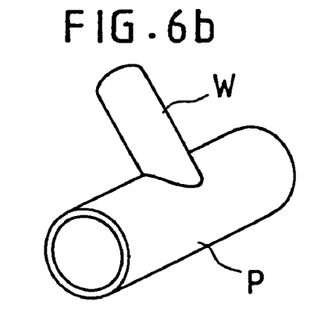

With the robot having the tool unit 11 according to the second embodiment, as shown in FIG. 5, by rotating the final axis 1 of the robot movable arm (rotational axis of the tool unit 11) and drivingly controlling the first and the second additional variable axes 11b and 11c in synchronism with the rotation of the final axis 1 of the robot movable arm while holding the final axis 1 and the central axis of a workpiece W of a pipe shape at a predetermined angle therebetween, the workpiece W of a pipe shape is cut to have an end portion inclined suitable for connecting with another pipe P, as shown in an elevation view of FIG. 6a and a perspective view of FIG. 6b. That is, when the workpiece W is to be connected to the pipe P, as shown in FIGS. 6a and 6b, machining as shown in FIG. 5 is carried out to cut the end portion of the workpiece W.

Figure 7:
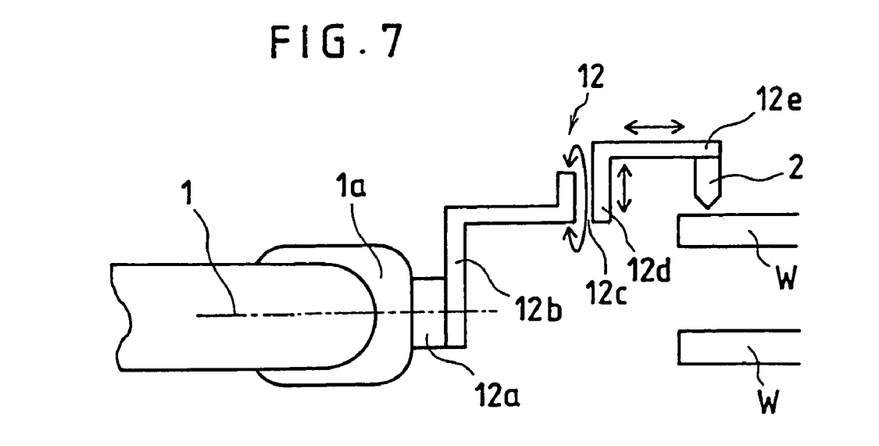
FIG. 7 is a schematic view of a tool unit according to a third embodiment of the invention.

FIG. 7 is a view showing essential portions of a third embodiment according to the invention. The third embodiment is used in machining a plurality of small pipes or in the case where a portion of a unitized part is cut.

A tool unit 12 according to the third embodiment is constituted by an attaching portion 12a for attaching the tool unit 12 to the robot wrist 1a, an axis 12b in an L shape extended from the attaching portion 12a in parallel with an attaching face of the robot wrist 1a (perpendicular to the final axis 1 of the movable arm of the robot) and bent perpendicularly at a distal end thereof, an additional rotational axis 12c provided at a distal end of the axis 12b, a first additional variable axis 12d connected to the additional rotational axis 12c for expanding and retracting in a direction in parallel with the attaching face of the robot wrist 1a, a second variable axis 12e connected to a distal end of the first variable axis 12d for expanding and retracting in a direction perpendicular.

When an end portion of a workpiece W of a small pipe is cut, the robot is positioned such that a central axis of the workpiece W to be cut and the rotational center axis of the additional rotational axis 12c are brought to coincide with each other and an end face of the workpiece W to be cut and an end face of the additional rotational axis 12c are opposed to each other. Further, the machining nozzle 2 is positioned at a position for cutting the workpiece W by driving the first and the second additional variable axes 12d and 12e., thereafter, the additional rotational axis 12c is rotated while irradiating the laser beam from the machining nozzle 2 by which the end face of the workpiece W is cut.

Further, when cutting a saddle shape or forming a hole on a peripheral face of the workpiece W, the second additional variable axis 12e may be driven in synchronism with rotation of the additional rotational axis 12c as has been explained in the second embodiment. Further, when the workpiece W of a small pipe has an elliptic section or a square section, cutting operation is carried out by synchronizing the rotation of the additional rotational axis 12c and the driving of the additional variable axis 12d similar to the second embodiment.

According to the third embodiment, when the workpiece W is cut, the plurality of axes of the robot movable arm are not driven and the robot per se stays in a stationary state and holds predetermined position and posture. The machining accuracy is improved since the plurality of axes of the movable arm are is not driven.

According to the above-described embodiments other than in the case of carrying out the machining method shown in FIG. 5, the direction of irradiating laser beam of the machining nozzle 2 is in a direction perpendicular to the peripheral face of the workpiece W and the cut face is perpendicular to the peripheral face of the workpiece W. Thus, only a section perpendicular to the central axis of the pipe-shaped workpiece W is obtained. When a pipe is cut in a saddle shape and the cut in the saddle shape is brought into contact with the peripheral face of another pipe, as shown in FIG. 11, for carrying out welding of the saddle shape, the cut face perpendicular to the peripheral face of the pipe provides a joint state as shown in FIG. 12a to make the welding operation difficult and welding of high strength is not obtained. However, if the cut face having an arbitrary angle that is relative to the surface of the pipe can be obtained, as shown in FIG. 12b, the cut face and the peripheral face of the other pipe are brought into close contact with each other and welding at the joint position becomes facilitated and solid.

Figure 8:
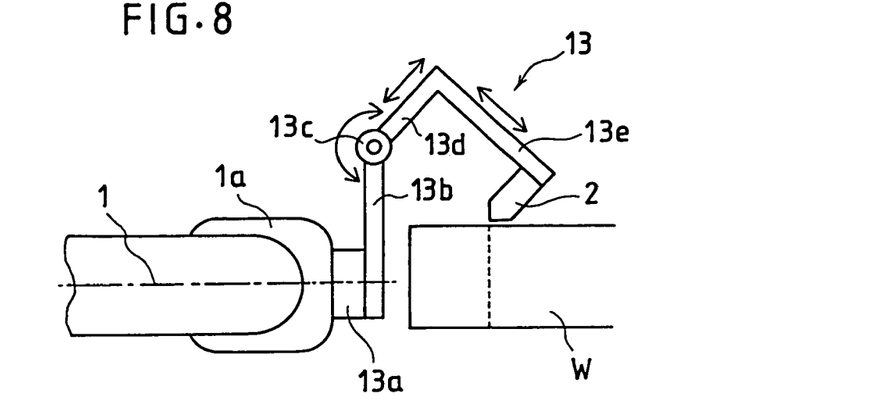
FIG. 8 is a schematic view of a tool unit according to a fourth embodiment of the invention.

Hence, a description will be given on a fourth embodiment in which a cut face having an arbitrary angle that is relative to a peripheral face of a pipe is obtained, referring to FIG. 8.

A tool unit 13 comprises an attaching portion 13a for attaching the tool unit 13 to the robot wrist 1a, a axis 13b extended from the attaching portion 13a perpendicularly to the final axis 1 of the movable arm of the robot and an additional rotary or pivoting axis 13c for angularly moving a first additional variable axis 13d relative to the axis 13b and the first additional variable axis 13d is constituted by a structure capable of linearly moving its distal end via a mechanism for converting rotational movement of a motor or a ball screw to a linear movement.

Further, the tool unit 13 is provided with a second additional variable axis 13e connected perpendicularly to a distal end of the first additional variable axis 13d for linearly moving a distal end thereof by a mechanism of converting rotational movement to linear movement similar to the first additional variable axis 13d and the machining nozzle 2 attached to a distal end of the second additional variable axis 13e.

When operation of cutting a saddle shape is carried out on a workpiece W of a pipe shape, the robot is positioned such that the central axis of the workpiece W of a pipe shape and the final rotational axis 1 of the movable arm of the robot are brought to coincide with each other and the robot wrist 1a and an end face of the workpiece W are opposed to each other. The rotational axis 13c is positioned at a rotational angle to provide an angle of a cut face in starting cutting operation, while the machining nozzle 2 is positioned at a cut start position by driving the first and the second variable axes 13d and 13e. Further, in accordance with a taught program, while rotating the final axis 1 of the movable arm of the robot, in synchronism with this rotation, the rotational axis 13c and the first and the second additional variable axes 13d and 13e are controlled to be driven such that there is carried out cutting operation providing the workpiece W with an arbitrary cut shape such as a saddle shape peripheral a hole. Further, also the fourth embodiment can also cut a workpiece which is not constituted by a single plane such as a pipe having a section in a cylindrical shape, a pipe having a section in an elliptic prism shape, or a pipe having a section in a square prism shape.

Figure 9:
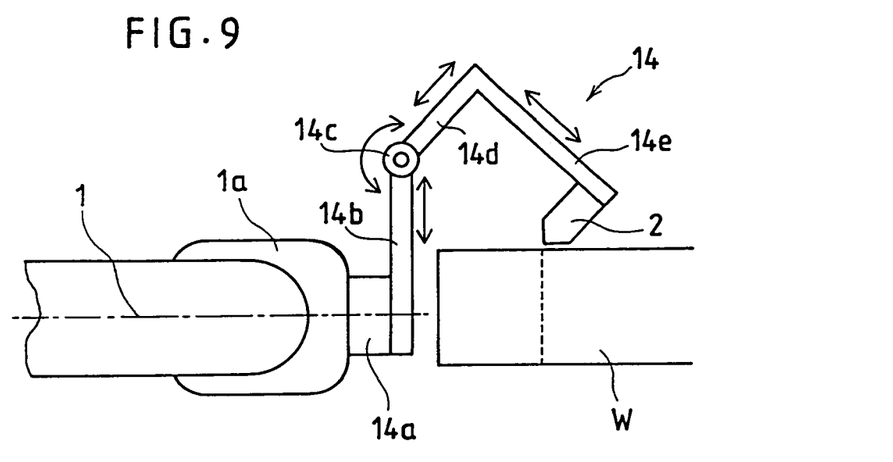
FIG. 9 is a schematic view of a tool unit according to a fifth embodiment of the invention.

Although the above-described fourth embodiment is restricted by a size (diameter) of the workpiece W to be machined, FIG. 9 shows a fifth embodiment alleviating the restriction-According to a tool unit 14 used in the fifth embodiment, the axis 13b according to the fourth embodiment is changed to a variable axis 14b. The fifth embodiment is provided with an attaching portion 14a for attaching the tool unit 14 to the robot wrist 1a, a first additional variable axis 14b extended from the attaching portion 14a perpendicularly to the final axis 1 of the movable arm of the robot where a distal end thereof is linearly moved, a rotary or pivoting axis 14c four angularly moving a second additional variable axis 14d relative to the first additional variable axis 1ob and further provided with a third additional variable axis 14e connected perpendicularly to a distal end of the second additional variable axis 14d for linearly moving its distal end and the machining nozzle 2 attached to a distal end of the third additional variable axis 14e. Each of the above-described first, second and third additional variable axes 14b, 14d and 14e is constituted by a structure in which its distal end can linearly be moved by a mechanism of converting rotational movement of a motor or a ball screw into linear movement.

A difference between the fifth embodiment and the fourth embodiment resides in whether or not the axis 14b (13b) extending from the attaching portion 14a (13a) perpendicularly to the final axis 1 of the movable arm is linearly moved, as mentioned above. As is apparent by comparing FIG. 8 with FIG. 9, in view of a change in the diameter of the workpiece, in view of inclination of the cut face, and also in view of a degree of freedom of a distance from the end face of the workpiece to the cut position, the fifth embodiment, where one additional variable axis is increased, becomes facilitated in dealing with the machining operation.

Figure 10:
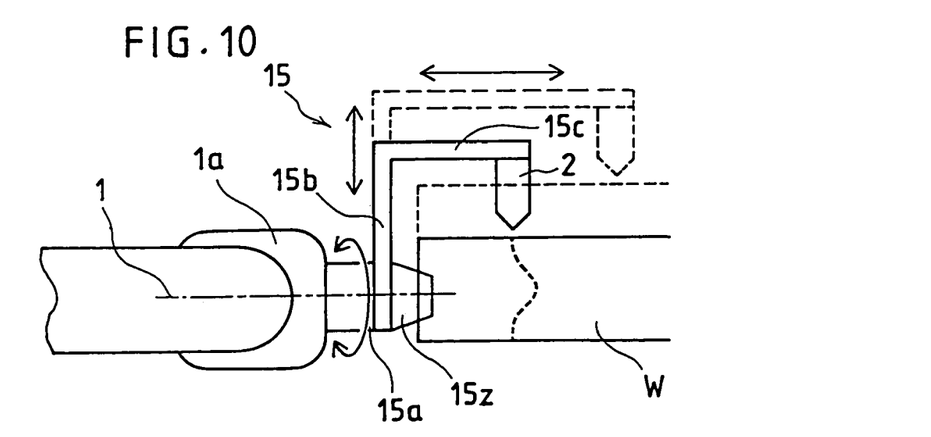
FIG. 10 is a schematic view of a tool unit according to a sixth embodiment of the invention.

FIG. 10 shows a sixth embodiment of the invention. According to the sixth embodiment, there is provided a tool unit which is easy to position and hold a pipe of a machining object relative to the tool unit (relative to the robot wrist). According to the embodiment, on an attaching portion 15a of a tool unit 15 for attachment to the robot wrist 1a there is attached a boss 15z in a shape of a frustum having a center axis in coincidence with the rotational center axis of the tool unit 15 (the final rotational axis 1 of the robot movable arm), and the boss 15z is brought to be opposed to a workpiece W of a pipe like shape. Further, the boss 15z is made rotatable to a main body of the tool unit 15. The robot is positioned such that the central axis of the pipe of the workpiece W coincides with the final rotational axis 1 of the movable arm of the robot (center axis of the robot wrist 1a, rotational center axis of the tool unit 15), the robot wrist is moved parallel along the axis to thereby press to fit the boss 15z to the pipe W of the workpiece such that the central axis of the pipe W is not deviated from the rotational axis of the tool unit 15. Further, while rotating the final axis 1 of the movable arm of the robot and rotating the tool emit 15, the workpiece is cut or drilled by the machining nozzle 2. When the tool unit 15 is rotated, although the boss 15z is rotated relative to the tool unit main body, the boss 15z is not rotated relative to the pipe of the workpiece W, and accordingly, while no hindrance is produced in rotating the tool unit main body 15, the pipe W is cut or a hole is formed therein such that the rotational center axis of the tool unit 15 coincides with the rotational center axis of the pipe W and therefore, high accurate machining operation can be carried out.

Although FIG. 10 provides an example of attaching the boss 15z to the second embodiment shown in FIG. 3, the boss 15z is applicable also to the tool units according to the first through the fifth embodiments mentioned above.

Next, an explanation will be given on machining operation on a workpiece by a robot with the above mentioned tool unit.

First, the nonvolatile memory portion of the memory 102 of the robot controller is previously stored with kinds of workpieces and calculation equations of paths of distal ends of tool units in respect of machining shapes. For example, when as an example, the workpiece W is a pipe in a circular pipe shape and saddle shape cutting is carried out in order to bring the workpiece W into abutment connection with the other pipe P as shown in FIG. 11, a calculation equation of a path of a distal end of a tool unit is calculated as follows.

Figure 16:
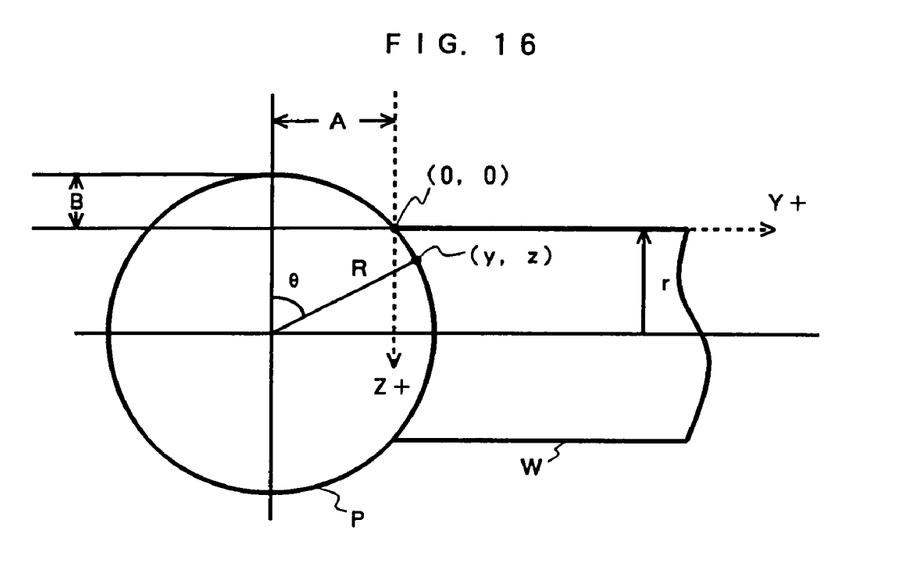
FIG. 16 is a schematic view for obtaining a calculation equation for calculating a path of a distal end of a tool unit in a saddle shape machining.
Figure 17:
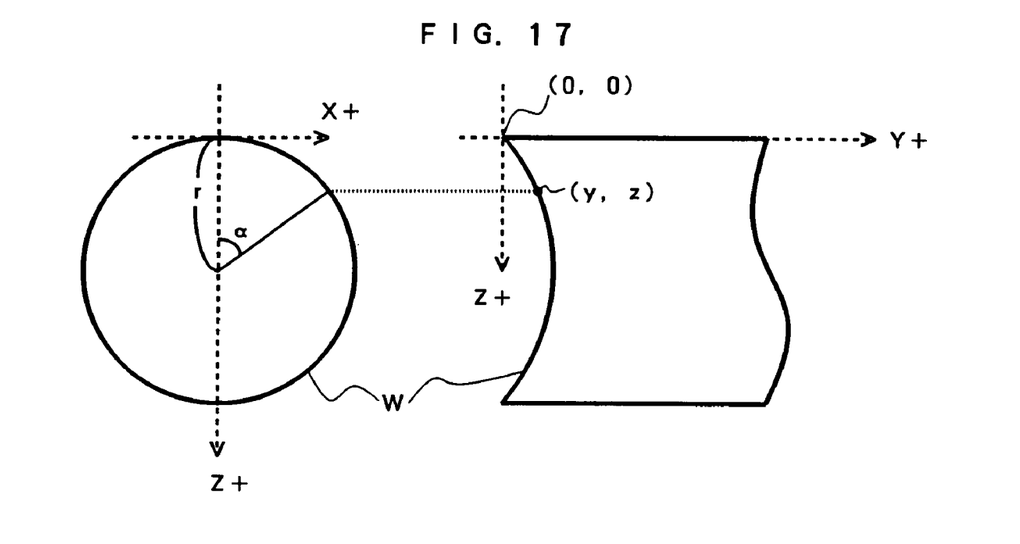
FIG. 17 is an additional schematic view for obtaining the calculation equation for calculating a path of a distal end of a tool unit in a saddle shape machining.

FIG. 16 and FIG. 17 are explanatory views showing a way of obtaining a calculation equation in respect of a path of a distal end of a tool unit when the workpiece W is cut in a saddle shape for connecting the workpiece (pipe) W to the pipe P. As shown in FIG. 16 and FIG. 17, the center axis of the pipe P (counterpart of abutting) is set to X-axis, the center axis of the workpiece W is set to Y-axis and an axis perpendicular to the X-axis and Y-axis is set to Z-axis. Further, the origin point of the perpendicular coordinates system is set to an uppermost position where the pipe P and the workpiece W are brought into contact with each other and + direction of Y-axis is set to a direction departing from the cut face and + direction of Z-axis is set to a downward direction.

As shown in FIG. 16, a radius of an outer diameter of the pipe P is designated by R, a radius of an outer diameter of the workpiece W is designated by notation r, a distance (distance in Y-axis direction) between the uppermost position (position of origin point) where the pipe P and the workpiece W are brought into contact with each other and the center axis of the pipe P is designated by notation A and a distance (distance in Z-axis direction) between a position of an uppermost end of the pipe P and the position of the origin point is designated by notation B.

An arbitrary position in the cut face of the workpiece W is defined by a position (y, z) of Y-axis and Z-axis and a rotational amount at the position from the uppermost position of the pipe P is defined as θ as illustrated by FIG. 16. Then, $$y = R\sin\theta - A$$

$$z = R - B - R\cos\theta = R(1 - \cos\theta) - B$$

accordingly, $$\sin\theta = (Y+A)/R$$

$$\cos\theta = 1 - \{(z+B)/R\}$$

further, $$\sin^2\theta + \cos^2\theta = 1$$

accordingly, $$[(y+A)/R]^2 + [1 - \{(z+B)/R\}]^2 = 1$$

accordingly, $$R^2 = (y+A)^2 + \{R-(z+B)\}^2 \quad (1)$$

further, as shown in FIG. 17, when in the workpiece W, a rotational angle of the arbitrary point (y, z) from the origin point is designated by notation α, the following Equation (2) is established.

$$z = r - r\cos\alpha = r(1 - \cos\alpha) \quad (2)$$

By substituting Equation (1) for Equation (2) to thereby calculate a relationship between the rotational angle α and the value y of Y-axis as follows.

$$y = [R^2 - [R - \{r(1-\cos\alpha)+B\}]^2]^{1/2} - A$$

$$= \pm [[2R - \{r(1-\cos\alpha)+B\}][r(1-\cos\alpha)+B]]^{1/2} - A$$

Accordingly, $$y = |[[2R - \{r(1-\cos\alpha)+B\}][r(1-\cos\alpha)+B]]^{1/2} - A| \quad (3)$$

In the above-described Equation (3), the rotational angle α is a rotational angle of the tool unit and signifies the rotational angle of the final axis 1a of the movable arm of the robot and the rotational speed is controlled to a set predetermined speed. Further, the value y of Y-axis signifies a position of moving the tool unit in the axial direction of the workpiece W and signifies a movement amount of the second variable axis according to each of the second embodiment and the third embodiment (axis moving in parallel with the center axis of the final axis 1a of the movable arm of the robot) and Equation (3) shows the calculation equation of the path of the distal end of the tool unit in accordance with rotation of the tool unit (rotation of the final axis 1a of the movable arm of the robot).

Further, in order to determine the calculation equation of the path of the distal end of the tool unit by Equation (3), the radius R of the pipe, the radius r of the workpiece, the distance A between the uppermost position where the workpiece W is brought into contact with the pipe P and the central axis of the pipe P and the distance B between the uppermost position of the pipe P and the uppermost position of the workpiece W, may be known. Hence, these data of R, r, A, B are set as portions of parameters in the saddle shape machining.

When the workpiece W is abutted and connected to the pipe P such that the central axis of the pipe P and the central axis of the workpiece W intersect with each other (when abutting is carried out such that the center line of the workpiece W is disposed on a central point of the pipe P), B=R−r, A=(R²−r²)^(1/2) and accordingly, in this case, Equation (3) becomes Equation (4) as follows.

$$y = |[(R+r\cos\alpha)(R-r\cos\alpha)]^{1/2} - (R^2-r^2)^{1/2}| \quad (4)$$

In this case the radii R and r may be set without setting the parameters A and B and the calculation equation of the path of the distal end of the tool unit may be used by using Equation (4).

Further, the nonvolatile memory portion of the memory 102 is stored with data giving workpiece numbers to a plurality of workpieces which are scheduled to machine and specifying kinds of workpieces W (a pipe having a circular section, a pipe having an elliptic section, a pipe having a square section etc.) and their shapes for respective work numbers and calculation equations of the paths of the distal ends of the tool units mentioned above are calculated in accordance with the workpiece numbers and machined shapes (plane cutting, saddle shape machining, forming a hole etc.) and are stored to the nonvolatile memory portion of the memory 102 of the robot controller. Further, the nonvolatile memory portion of the memory 102 is stored with machined shapes capable (not capable) of machining workpieces in respect of numbers in correspondence with kinds of workpieces W, names of modes of machining such as cutting, saddle shape machining, forming a hole and the like as well as the workpiece numbers (kinds of workpieces).

Figure 14:
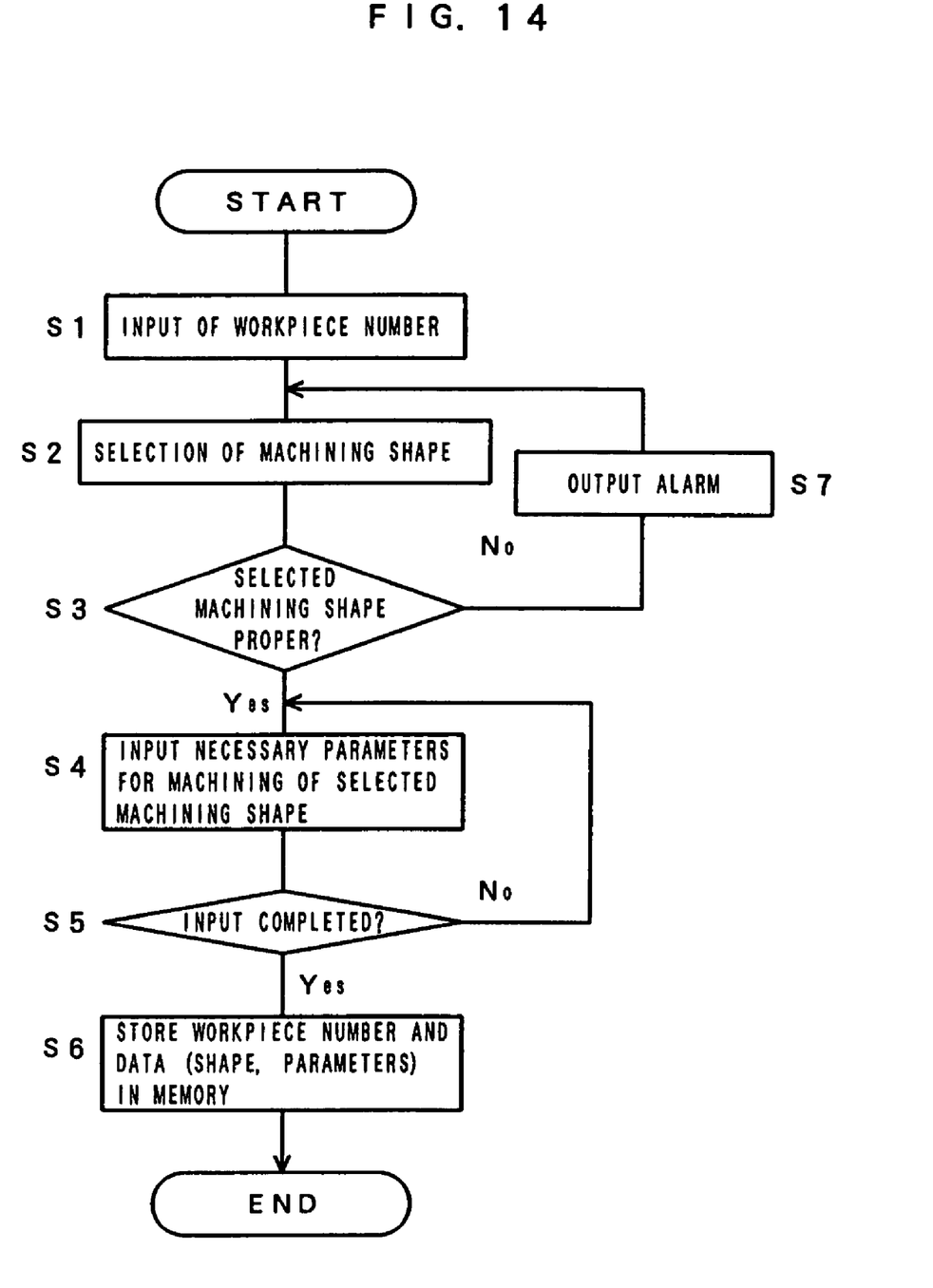
FIG. 14 is a flowchart of teaching operation processing for machining according to the invention.

In teaching operation for machining, when a command for teaching operation is inputted from the teaching operation panel 104 to the robot controller, CPU 101 of the robot controller starts teaching processing shown in FIG. 14.

First, kinds of workpieces and numbers in correspondence thereto are displayed on a display screen of the teaching operation panel 104 and an operator inputs a number in accordance therewith to thereby select a kind of a workpiece (Step S1), then, CPU 101 displays kinds of shapes and urges selection (Step S2). When the operator selects a machining shape, the operation determines whether the selected shape can be machined in respect of shapes of workpieces in correspondence with the inputted workpiece number based on a set storage content (Step S3) and when the machining cannot be carried out, an alarm is outputted (Step S7) and the operation urges again selection of machining shape.

Further, when the selected machining shape is proper, the operation displays names of parameters necessary for machining the machining shape and awaits for input of respective parameters (Step S4). In the case of saddle shape cutting mentioned above, the radius R of a cylindrical body of a pipe on the side of the counterpart which is to be abutted with a cut workpiece W, the radius r of the workpiece to be cut, the parameters A and B and a wall thickness of the workpiece W for determining output of laser, are set and inputted. When all of the parameters and the wall thickness of the workpiece W concerning the selected machining shape are set and a setting finish signal is inputted, CPU 101 stores the inputted workpiece number, the machining shape and the parameters at the nonvolatile memory portion of the memory 102 as machining data and teaching of machining operation is finished.

Figure 15:
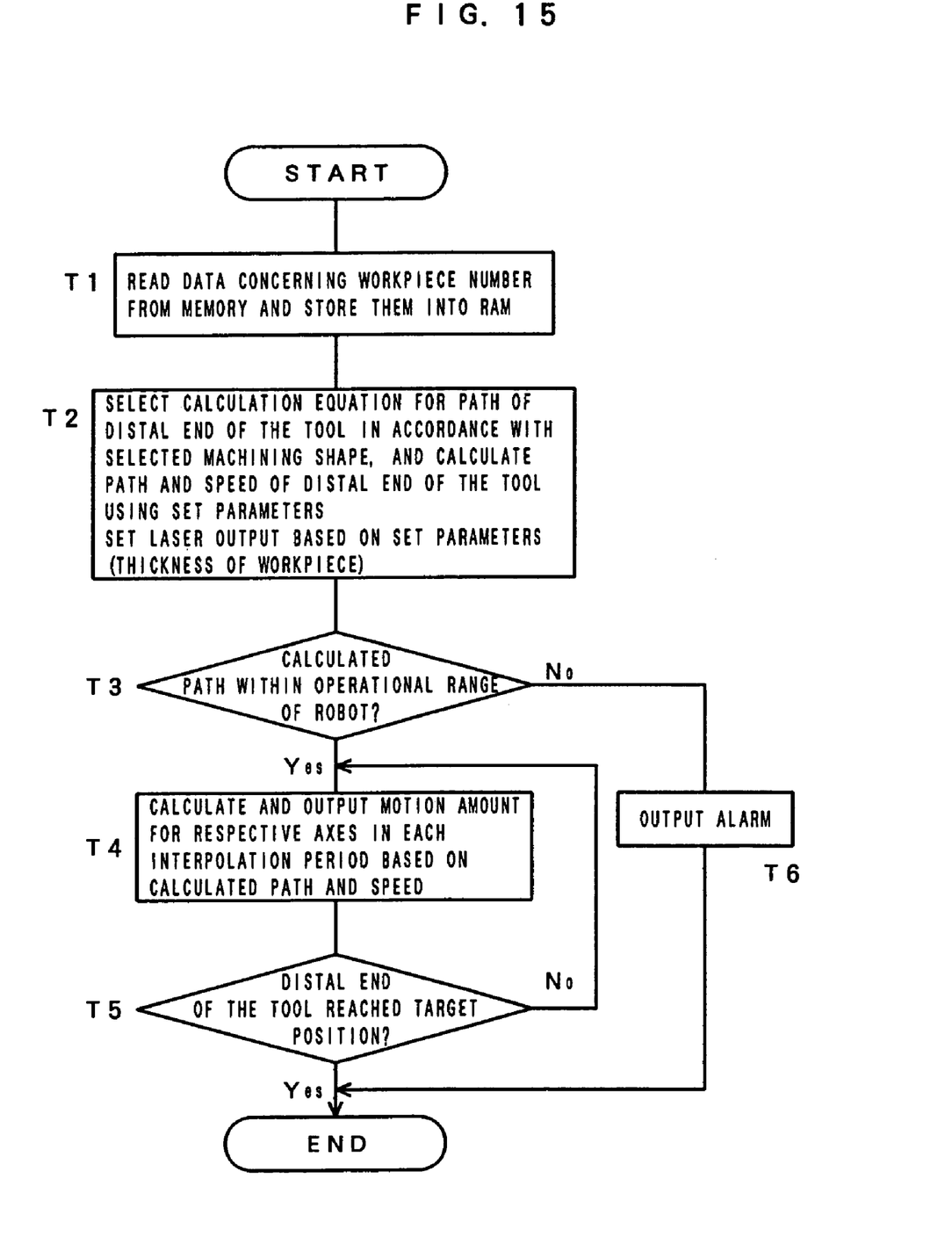
FIG. 15 is a flowchart of machining operation processing according to the invention.

When machining is actually carried out, by a teaching program, after positioning a tool unit attached to a robot wrist to a workpiece, that is, after the center axis of the workpiece W and the rotational center axis of the final axis of the movable arm of the robot coincide with each other and the machining nozzle 2 of the tool unit is positioned at a machining start position of the workpiece W, when a workpiece number and a machining command are read from the teaching program, CPU starts machining processing of FIG. 15.

First, the CPU reads the machining data (machining shape and parameters) in correspondence with the read workpiece number from the nonvolatile memory section of the memory 102 and stores in the RAM (Step T1), selects a calculation equation of a path of a distal end of the tool unit from the workpiece number and the selected machining shape, carries out planning of the path based on a motion command by using values of set parameters and calculates the path and speed of the distal end of the tool unit. Further, output power of laser is calculated from the wall thickness of the set workpiece W and is outputted to the laser oscillator 108 (Step T2).

Next, it is determined whether or not the calculated path falls in an operational range of the robot, and when the path is out of the range an alarm is outputted (Step T6) and the machining processings are finished. When the path is within the range, the CPU calculates movement amounts of respective axes at each interpolation period based on the path and the speed calculated by the path scheme at Step T2 and outputs them to thereby drive servo motors of respective axes (Step T4). That is, in the case of saddle shape cutting mentioned above, the final axis 1a of the movable arm of the robot is rotated at the set predetermined speed and motion command amounts for respective interpolation periods are calculated and outputted to the additional variable axis (the second additional variable axis 11c in the second embodiment, the second additional variable axis 12e in the third embodiment) which is moved in parallel with the rotational center axis of the final axis 1a. Further, it is determined whether or not the movement reaches a desired position (Step T5) and the interpolation processing is carried out until the movement reaches the desired position, and when the movement reaches the desired position, the machining processing is terminated.

According to the present invention, a workpiece of a pipe shape can be cut only by rotating a final axis of a movable arm of a robot and without driving other movable arms of the robot. Accordingly, machining operation having high machining accuracy can be carried out. Further, by providing a linear movement axis or a rotary or pivoting axis at a tool unit, the machining for forming a hole or the saddle shape cutting on a workpiece of a pipe shape an be performed. Further, it is possible to machine a pipe shaped workpiece to have a slant cut face with respect to an outer surface thereof.

What is claimed is:

1. A robot system, comprising:
a movable arm including a plurality of links and a wrist connected by joints and controlled by a robot controller having a software processing function; and
a cutting tool unit mounted on said wrist at a distal end of said movable arm, having a cutting effecting end point biased with a radial offset with respect to a final rotational axis of said wrist and directed to said final rotational axis, and a variable axis varying a position or a direction of said effecting end with respect to said final rotational axis of said wrist,
wherein said variable axis of the said cutting tool unit includes a linear axis.

2. A robot system according to claim 1, wherein said linear axis allows said effecting end to move perpendicularly or parallel to said final rotational axis.

3. A robot system according to claim 1, wherein said variable axis includes a rotary axis.

4. A robot system according to claim 1, wherein a linear axis and a rotary axis are provided, each functioning as said variable axis.

5. A robot system comprising:
a movable arm including a plurality of links connected by joints and controlled by a robot controller having a software processing function; and
a tool unit mounted on a distal end of said movable arm, having an additional rotation axis biased with respect to a final rotational axis of said movable arm and an effecting end biased with respect to said additional rotation axis and directed to said additional rotation axis, and a variable axis varying a position or a direction of the effecting end with respect to the final rotational axis of said moveable arm,
wherein said variable axis of said tool unit includes a linear axis.

6. A method of machining a cylindrical workpiece with a robot system comprising a movable arm including a plurality of links and a wrist connected by joints and controlled by a robot controller having a software processing function, a cutting tool unit mounted on said wrist at a distal end of said movable arm, and having a cutting effecting end point biased with a radial offset with respect to a final rotational axis of said wrist and directed to said final rotational axis, and a variable axis varying a position or a direction of said cutting effecting end with respect to said final rotational axis of said wrist, said method comprising:
(a) arranging the workpiece so that a central axis of the workpiece is aligned with the final rotational axis of said wrist; and
(b) rotating said final rotational axis to perform cutting machining on the workpiece,
wherein said variable axis of said cutting tool unit includes a linear axis.

7. A method of machining a cylindrical workpiece according to claim 6, wherein said linear axis allows said effecting end to move perpendicularly or parallel to said final rotational axis.

8. A method of machining a cylindrical workpiece according to claim 6, wherein said variable axis includes a rotary axis.

9. A method of machining a cylindrical workpiece according to claim 6, wherein a linear axis and a rotary axis are provided, each functioning as said variable axis.

10. A method of machining a pipe-like workpiece with a robot system comprising a movable arm including a plurality of links connected by joints and controlled by a robot controller having a software processing function, and a tool unit mounted on a distal end of said movable arm and having an effecting end and a variable axis for varying a position or a direction of said effecting end with respect to a final rotational axis of said movable arm, said method comprising the steps of:
  (a) arranging the workpiece so that a central axis of the workpiece is aligned with the final rotational axis of said movable arm; and (b) rotating said final rotational axis and driving said variable axis in synchronism with the rotation of said final rotational axis to perform a saddle-like cutting or forming a hole on the workpiece, wherein said variable axis of said tool unit includes a linear axis.

* * * * *

UNITED STATES PATENT AND TRADEMARK OFFICE
CERTIFICATE OF CORRECTION

PATENT NO. : 7,092,791 B2
APPLICATION NO. : 09/265432
DATED : August 15, 2006
INVENTOR(S) : Akihiro Terada et al.

It is certified that error appears in the above-identified patent and that said Letters Patent is hereby corrected as shown below:

Title Page Column 2 (Abstract), Line 6, change "moveable" to --movable--.

Title Page Column 2 (Abstract), Line 16, change "the" to --therefore--.

Column 4, Line 13, after "the" delete "a".

Column 5, Line 22, change "axis." to --axis--.

Column 6, Line 21, change "perpendicular." to --perpendicular to the first additional axis 12d and the machining nozzle 2 attached to a distal end of the second additional variable axis 12e in which a direction of irradiating laser beam is directed in a direction perpendicular to the additional rotational axis 12c (the final axis 1 of the movable arm of the robot).--.

Column 6, Line 30, change "12e.," to --12e--.

Column 6, Line 50, after "are" delete "is".

Column 7, Line 51, change "restriction-According" to --restriction. According--.

Column 7, Line 61, Change "lob" to --14b--.

Column 8, Line 19, after "the" insert --sixth--.

Column 10, Line 23, change "$y= | [(R+r\cos a)(R-r\cos a)]^{1/2} - (R^2 - r^{1/2}|$" to --$y= | [(R+r\cos a)(R-r\cos a)]^{1/2} - (R^2 - r^2)^{1/2} |$--.

Column 11, Line 64, change "an" to --can--.

UNITED STATES PATENT AND TRADEMARK OFFICE
CERTIFICATE OF CORRECTION

PATENT NO.      : 7,092,791 B2
APPLICATION NO. : 09/265432
DATED           : August 15, 2006
INVENTOR(S)     : Akihiro Terada et al.

It is certified that error appears in the above-identified patent and that said Letters Patent is hereby corrected as shown below:

Column 12, Line 34, change "moveable" to --movable--.

Signed and Sealed this

Ninth Day of January, 2007

JON W. DUDAS
*Director of the United States Patent and Trademark Office*